United States Patent [19]

Wheeler

[11] 3,928,333

[45] Dec. 23, 1975

[54] PROCESS FOR THE PREPARATION OF 3 CEPHALOSPORIN ESTERS

[75] Inventor: William J. Wheeler, Indianapolis, Ind.

[73] Assignee: Eli Lilly and Company, Indianapolis, Ind.

[22] Filed: May 20, 1974

[21] Appl. No.: 471,527

[52] U.S. Cl. .............................. 260/243 C; 424/246
[51] Int. Cl.² ...................................... C07D 501/02
[58] Field of Search ..................... 260/243 C, 239.1

[56] References Cited
UNITED STATES PATENTS
3,697,507   10/1972   Frederiksen et al. ........... 260/243 C Primary Examiner—Nicholas S. Rizzo
Attorney, Agent, or Firm—Walter E. Buting; Everet F. Smith

[57] ABSTRACT

A new and more efficient process for the esterification of $\Delta^3$ cephalosporin acids which comprises adding one equivalent of base to an equimolar mixture of a $\Delta^3$ cephalosporin acid and a halomethyl ester of a lower alkanoic acid at a rate such that the rate of generation of acid anion is approximately equivalent to the rate of esterification.

5 Claims, No Drawings

PROCESS FOR THE PREPARATION OF 3 CEPHALOSPORIN ESTERS

BACKGROUND OF THE INVENTION

The concept of esterifying β-lactam antibiotics to enhance oral absorption is known in the art. An illustration of the problem associated with the esterification of cephalosporin antibiotics in particular is described by Binderup et al., *J. Antibiotics*, 24, 767 (1971). Sodium cephalothin was converted into a mixture of $\Delta^2$ and $\Delta^3$ acetoxymethyl esters on reaction with chloromethyl acetate. In order to obtain the pure, orally active $\Delta^3$ acetoxymethyl ester, the mixture of isomers was oxidized with m-chloroperbenzoic acid to give the $\Delta^3$ sulfoxide ester. The sulfoxide ester was reduced to the sulfide ester with $PCl_3$ by the method of Kaiser et al., *J. Org. Chem.*, 35, 2430 (1970). Alternatively, isomeric mixtures of $\Delta^2$, $\Delta^3$ esters can be separated by laborious chromatographic procedures.

The problem of $\Delta^2$, $\Delta^3$ double bond isomerization is discussed at length by Murphy and Webber in "Cephalosporins and Penicillins, Chemistry and Biology," E. H. Flynn, Ed., Academic Press, New York and London, 1972, pp. 147–151 and pp. 172–176.

An intrinsic feature of known esterification methods employing $\Delta^3$ cephalosporin acid salts is the presence of relatively high initial concentrations of acid anion in the reaction. The presence of acid anion in excess promotes the isomerization of the $\Delta^3$ double bond of the ester product. Therefore, the initial stages of the present esterification methods characterized by high concentrations of acid anion and low concentrations of ester product, give rise to conditions which are extremely favorable for $\Delta^2$ double bond formation. Only in the late stages of the esterification is there a low concentration of acid anion, but by that time some of the ester product has been converted to the $\Delta^2$ isomer.

Furthermore, Cocker et al., *J. Chem. Soc.*, 1142 (1966), have shown that base causes isomerization of a $\Delta^3$ cephalosporin acid or ester double bond. Therefore, the presence of excess base in esterification mixtures can produce isomeric esters which are difficult to separate.

Morin et al., *J. Am. Chem. Soc.*, 91, 1401 (1969), have indicated that under alkaline conditions the $\Delta^2$, $\Delta^3$ double bond equilibrium probably reflects the difference in bulk of the substituent in the 3-position of the cephalosporin compound.

This invention is concerned with an improvement in the esterification of $\Delta^3$ cephalosporin acid compounds which produces $\Delta^3$ ester with only minimal or trace amounts of the $\Delta^2$ isomer. The $\Delta^3$ cephalosporin esters produced by this process require only simple methods of purification, since impurities are minimal. The $\Delta^3$ cephalosporin acyloxymethyl esters produced by the process of this invention are antibiotics having enhanced oral absorption.

Acyloxymethyl esters of various penicillin compounds are described by Daehne et al., *J. Med. Chem.*, 13, 607 (1970) and in the following U.S. Patents: U.S. Pat. Nos. 2,578,570, 2,650,218, 3,250,679, 3,654,265, 3,679,663, 3,719,668, 3,720,664, 3,720,665. Acyloxymethyl esters of various cephalosporin compounds are described in the following U.S. Patents: U.S. Pat. Nos. 3,485,819, 3,488,729, 3,708,479 and in West German Pat. No. 2,230,620 and Belgian Pat. No. 784,800.

SUMMARY OF THE INVENTION

This invention is concerned with an improved process for preparing a $\Delta^3$ cephalosporin ester of the formula

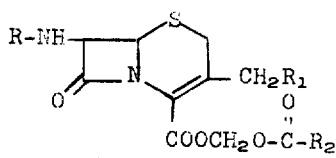

which comprises reacting a $\Delta^3$ cephalosporin acid of the formula

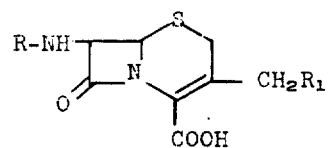

with a halomethyl ester of a lower alkanoic acid of the formula

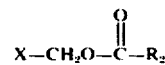

in the presence of base in an inert solvent at a temperature below 50°C. and recovering the product, the improvement which comprises adding one equivalent of base to an equimolar mixture of the acid and the halomethyl ester at a rate such that the rate of generation of acid anion is approximately equivalent to the rate of esterification;
wherein
R is acetyl, mandeloyl, O-formylmandeloyl, 2-phenoxyacetyl, 2-phenylacetyl, N-t-BOC-phenylglycyl, 2-(2-thienyl)acetyl or 2-(1,2,3,4-tetrazol-1-yl)acetyl;
$R_1$ is hydrogen, acetoxy, methylthio, (2-methyl-1,3,4-thiadiazol-5-yl)thio or (1-methyl-1,2,3,4-tetrazol-5-yl)thio;
$R_2$ is methyl, ethyl, isopropyl or tert-butyl; and
X is chloro, bromo or iodo;
subject to the limitations that when R is N-t-BOC-phenylglycyl, $R_1$ is other than acetoxy, (2-methyl-1,3,4-thiadiazol-5-yl)thio or (1-methyl-1,2,3,4-tetrazol-5-yl)thio.

DETAILED DESCRIPTION AND PREFERRED EMBODIMENTS

This invention is concerned with an improved process for preparing a $\Delta^3$ cephalosporin ester of the formula

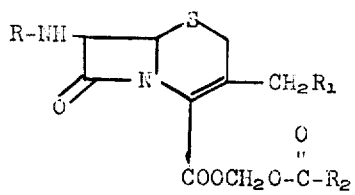

which comprises reacting a Δ³ cephalosporin acid of the formula

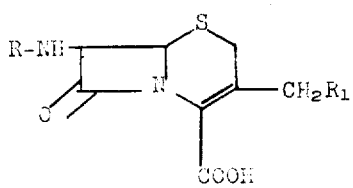

with a halomethyl ester of a lower alkanoic acid of the formula

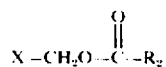

in the presence of base in an inert solvent at a temperature below 50°C. and recovering the product, the improvement which comprises adding one equivalent of base to an equimolar mixture of the acid and the halomethyl ester at a rate such that the rate of generation of acid anion is approximately equivalent to the rate of esterification;
wherein
R is acetyl, mandeloyl, 0-formylmandeloyl, 2-phenoxyacetyl, 2-phenylacetyl, N-t-BOC-phenylglycyl, 2-(2-thienyl)acetyl or 2-(1,2,3,4-tetrazol-1-yl)acetyl;
$R_1$ is hydrogen, acetoxy, methylthio, (2-methyl-1,3,4-thiadiazol-5-yl)thio or (1-methyl-1,2,3,4-tetrazol-5-yl)thio;
$R_2$ is methyl, ethyl, isopropyl or tert-butyl; and
X is chloro, bromo or iodo;
subject to the limitations that when R is N-t-BOC-phenylglycyl, $R_1$ is other than acetoxy, (2-methyl-1,3,4-thiadiazol-5-yl)thio or (1-methyl-1,2,3,4-tetrazol-5-yl)thio The term "N-t-BOC-phenylglycyl" refers to the α-phenylglycyl group protected on the amino group with the tert-butyloxycarbonyl group. After esterification the N-t-BOC group can be removed by treatment with formic acid or trifluoroacetic acid to provide the antibiotically active 7-(α-phenylglycylamino) cephalosporin ester.

The term "halo" as used herein with respect to halomethyl ester refers to chloro, bromo, or iodo. Typical examples of halomethyl esters of lower alkanoic acids which can be used in the process of this invention are: chloromethyl acetate, bromomethyl acetate, bromomethyl n-propionate, iodomethyl n-butanoate, bromomethyl pivalate, chloromethyl pivalate, and the like. Preferred halomethyl esters of lower alkanoic acids are chloromethyl acetate, bromomethyl acetate, chloromethyl pivalate, and bromomethyl pivalate.

The esterification reaction is preferably carried out in an inert organic solvent and in the presence of a suitable base. Suitable inert solvents include amides, halogenated hydrocarbons, sulfoxides, ethers, ketones, and the like. Examples of inert solvents include acetonitrile, N,N-dimethylformamide (DMF), N,N-dimethylacetamide (DMAC), dichloromethane, chloroform, dimethylsulfoxide (DMSO), diethyl sulfoxide, diethyl ether, dioxane, tetrahydrofuran (THF), acetone, methyl ethyl ketone and the like. The particular solvent is not critical. Preferred solvents include DMF, acetone and acetonitrile.

A base is employed in the esterification to promote acid anion formation and also to act as an acid binding agent. The particular base employed is not critical, and can either be organic or inorganic. Suitable organic bases include secondary and tertiary amines such as dicyclohexylamine, N-ethylaniline, morpholine, diethylamine, N,N-diethylaniline, N-methylmorpholine, pyridine, triethylamine and the like. Secondary amines can be employed in the process because they react preferably with the cephalosporin acid rather than the halomethyl ester.

Inorganic bases which can be employed include the alkali metal bicarbonates, carbonates or hydroxides such as sodium bicarbonate, lithium carbonate, potassium hydroxide, and the like. Preferably the alkali metal bases are dissolved in a minimum amount of water and then are diluted with the preferred solvents to provide homogeneous solutions.

Preferred bases used in the process of this invention are dicyclohexylamine, triethylamine, and pyridine.

The preferred amount of base used in the esterification is one equivalent relative to the cephalosporin acid compound. The cephalosporin acid and the haloester reagents are preferably combined in equimolar amounts. However, an excess of the halomethyl ester may be used to increase the efficiency of esterification.

Under the conditions of the process, the base is never present in excess because it reacts immediately with the acid in the esterification mixture to form the acid anion. While reverse addition of base desirably limits the presence of excess base, rapid addition or portionwise, bulk addition of base would generate undesirably large amounts of acid anion. In order to maintain desirably low concentrations of anion in the esterification mixture, the rate of generation of acid anion should be of the same order as the rate of esterification. The rate of generation of acid anion is dependent upon the concentration of the base and its rate of addition.

The rate of esterification of the acid is dependent upon the bulk of the substituent group at the 3-position of the cephalosporin acid compound and the reactivity of the particular haloester employed. For example, cephalosporin acids with methyl, acetoxymethyl or methylthio groups at the 3-position esterify more rapidly than those with heterocyclic substituents.

The relative order of reactivity of the halomethyl esters is more dependent upon the electronegativity of the halo substituent than upon the particular ester moiety. The iodo- and the bromomethyl esters are more reactive than the chloro esters and therefore they are preferred. The bulk of the ester moiety does have some steric effects when the ester is a pivalate ester, for example. However, the slower rate caused by steric effects can be compensated for by employing the more reactive iodo- or bromomethyl pivalate.

It will be recognized by those familiar with the cephalosporin art that in a particular case, the rate of addition of base will be dependent upon the particular cephalosporin acid and halomethyl ester employed. The base is added at a rate such that the generation of acid anion is approximately equivalent to the rate of esterification, the rate of esterification being different for different acids. The rate of generation of acid anion can be made approximately equivalent to the rate of esterification by means such as (1) conditions of high dilution, (2) a very slow rate of addition of base, (3)

addition of base at a rate approximately equivalent to the rate of precipitation of base salt, and (4) the use of bromide ion to increase the rate of esterification of less reactive esters.

The process of this invention is preferably carried out under conditions of high dilution and controlled rates of addition of base. The base is employed in dilute concentration by dissolving it in an inert solvent or solvent mixture. Although the concentration is not critical, a base concentration of about 0.10 to about 1.0 millimolar with respect to the particular diluent can be suitably employed. If desired, more dilute solutions of base can be used. Furthermore, the base is again diluted upon admixture with the reaction medium. The rate of addition of base can be controlled by means of a syringe pump or by dropwise addition. When the iodo- and bromomethyl esters are employed, the preferred rate of base addition is about five to 20 drops per minute. A slower rate of addition is employed when the reactant is a chloromethyl ester. Bromide ion in the form of a soluble salt can be added to the esterification mixture to increase the reactivity of chloromethyl esters. In addition, the rate of precipitation of the base salt from solution is often an indirect measure of the rate of esterification and the addition of base can be adjusted accordingly. Ideally, the addition of base should take place over a very long period of time. Practically however, the addition is carried out over several hours in preferably dimethylformamide at a rate determined by appearance of the base salt, for example.

Under the preferred conditions of slow addition of dilute base, desirably low concentrations of acid anion are generated in the esterification mixture, thereby minimizing double bond isomerization.

The reaction is generally carried out at a temperature below about 50°C., preferably at 20° to 30°C. The reaction is substantially complete after about 2 to about 24 hours. For best results, the reaction is allowed to continue from about 4 to about 14 hours. The product may be isolated by adding the reaction mixture to a suitable water immiscible organic solvent, such as ethyl acetate or chloroform, for example, and washing the solution with excess water to rid the product of reaction solvents and salts. Unreacted carboxylic acid in the organic phase can be washed out with a dilute base, for example, dilute sodium hydroxide or sodium bicarbonate without appreciable isomerization of the ester product. The ester product is generally recovered as a solid, and can be further purified if desired by standard methods such as crystallization or chromatography for example.

The cephalosporin acids, which are required as starting materials in the present invention can be prepared according to any of a variety of methods described in detail in U.S. Pat. Nos. 3,516,997, 3,641,021, 3,743,644, and 3,766,175, for example.

The halomethyl esters of lower alkanoic acids are readily available compounds. For example, chloromethyl acetate can be prepared by the method of M. Descude, *Bull. Soc. Chim.* France [3] 27, 867 (1902)

Exemplary of the cephalosporin acid compounds which can be employed in the process of this invention are the following:

7-acetamido-3-methyl-3-cephem-4-carboxylic acid,
7-acetamido-3-acetoxymethyl-3-cephem-4-carboxylic acid,
7-acetamido-3-methylthiomethyl-3-cephem-4-carboxylic acid,
7-acetamido-3-(2-methyl-1,3,4-thiadiazole-5-thiomethyl)-3-cephem-4-carboxylic acid,
7-acetamido-3-(1-methyl-1,2,3,4-tetrazole-5-thiomethyl)-3-cephem-4-carboxylic acid,
7-(2-phenylacetamido)-3-methyl-3-cephem-4-carboxylic acid,
7-(2-phenylacetamido)-3-acetoxymethyl-3-cephem-4-carboxylic acid,
7-(2-phenylacetamido)-3-methylthiomethyl-3-cephem-4-carboxylic acid,
7-(2-phenylacetamido)-3-(2-methyl-1,3,4-thiadiazole-5-thiomethyl)-3-cephem-4-carboxylic acid.

7-(2-phenylacetamido)-3-(1-methyl-1,2,3,4-tetrazole-5-thiomethyl)-3-cephem-4-carboxylic acid,
7-(2-phenoxyacetamido)-3-methyl-3-cephem-4-carboxylic acid,
7-(2-phenoxyacetamido)-3-acetoxymethyl-3-cephem-4-carboxylic acid,
7-(2-phenoxyacetamido)-3-methylthiomethyl-3-cephem-4-carboxylic acid,
7-(2-phenoxyacetamido)-3-(2-methyl-1,3,4-thiadiazole-5-thiomethyl)-3-cephem-4-carboxylic acid, 7-(2-phenoxyacetamido)-3-(1-methyl-1,2,3,4-tetrazole-5-thiomethyl)-3-cephem-4-carboxylic acid,
7-[2-(2-thienyl)acetamido]-3-methyl-3-cephem-4-carboxylic acid,
7-[2-(2-thienyl)acetamido]-3-acetoxymethyl-4-carboxylic acid,
7-[2-(2-thienyl)acetamido]-3-methylthiomethyl-3-cephem-4-carboxylic acid,
7-[2-(2-thienyl)acetamido]-3-(2-methyl-1,3,4-thiadiazole-5-thiomethyl)-3-cephem-4-carboxylic acid, 7-[2-(2-thienyl)acetamido]-3-(1-methyl-1,2,3,4-tetrazole-5-thiomethyl)-3-cephem-4-carboxylic acid,
7-mandelamido-3-methyl-3-cephem-4-carboxylic acid,
7-mandelamido-3-acetoxymethyl-3-cephem-4-carboxylic acid,
7-mandelamido-3-methylthiomethyl-3-cephem-4-carboxylic acid,
7-mandelamido-3-(2-methyl-1,3,4-thiadiazole-5-thiomethyl)-3-cephem-4-carboxylic acid,
7-mandelamido-3-(1-methyl-1,2,3,4-tetrazole-5-thiomethyl)-3-cephem-4-carboxylic acid,
7-($\alpha$-phenyl-N-t-BOC-glycylamino)-3-methyl-3-cephem-4-carboxylic acid,
7-($\alpha$-phenyl-N-t-BOC-glycylamino)-3-methylthiomethyl-3-cephem-4-carboxylic acid,
7-[2-(1,2,3,4-tetrazol-1-yl)acetamido]-3-methyl-3-cephem-4-carboxylic acid,
7-[2-(1,2,3,4-tetrazol-1-yl)acetamido]-3-acetoxymethyl-3-cephem-4-carboxylic acid,
7-[2-(1,2,3,4-tetrazol-1-yl)acetamido]-3-methylthiomethyl-3-cephem-4-carboxylic acid,
7-[2-(1,2,3,4-tetrazol-1-yl)acetamido]-3-(2-methyl-1,3,4-thiadiazole-5-thiomethyl)-3-cephem-4-carboxylic acid,
7-[2-(1,2,3,4-tetrazol-1-yl)acetamido]-3-(1-methyl-1,2,3,4-tetrazole-5-thiomethyl)-3-cephem-4-carboxylic acid,
7-(O-formylmandelamido)-3-methyl-3-cephem-4-carboxylic acid,
7-(O-formylmandelamido)-3-acetoxymethyl-3-cephem-4-carboxylic acid, 7-(0-formylmandelamido)-3-methylthiomethyl-3-cephem-4-carboxylic acid, 7-(0-formylmandelamido)-3-(2-methyl-1,3,4-thiadiazole-5-thiomethyl)-3-cephem-4-carboxylic acid, and 7-(0-formylmandelamido)-3-(1-methyl-1,2,3,4-tetrazole-5-thiomethyl)-3-cephem-4-carboxylic acid.

Example 1

Pivaloyloxymethyl 7-D-mandelamido-3-(1-methyl-1,2,3,4-tetrazole-5-thiomethyl)-3-cephem-4-carboxylate To a solution of 4.62 g. of 7-D-mandelamido-3-(1-methyl-1,2,3,4-tetrazole-5-thiomethyl)-3-cephem-4-carboxylic acid, 1.53 g. of chloromethyl pivalate and 1.03 g. of sodium bromide in 25 cc. of DMF was added dropwise a solution of 1.81 g. of dicyclohexylamine in 15 cc. of DMF. The reaction mixture was stirred for twelve hours at room temperature. After filtering the reaction mixture the filtrate was added to 700 cc. of ethyl acetate. The organic solution was washed successively with aqueous saturated sodium chloride solution, aqueous sodium bicarbonate solution, 1N hydrochloric acid, and water. After drying the organic solution, the solvent was removed under reduced pressure to provide 1.6 g. of crystalline residue. The residue was recrystallized from fresh ethyl acetate to afford pivaloyloxymethyl 7-D-mandelamido-3-(1-methyl-1,2,3,4-tetrazole-5-thiomethyl)-3-cephem-4-carboxylate, m.p. 174–176°C.

Analysis: $C_{24}H_{28}N_6O_7S_2$ (percent): Calc: C, 49.99; H, 4.89; N, 14.57; Found: C, 49.72; H, 4.83; N, 14.37.

Example 2

Acetoxymethyl 7-[2-(1,2,3,4-tetrazol-1-yl)acetamido]-3-(2-methyl-1,3,4-thiadiazole-5-thiomethyl)-3-cephem-4-carboxylate 7-[2-(1,2,3,4-Tetrazol-1-yl)acetamido]-3-(2-methyl-1,3,4-thiadiazole-5-thiomethyl)-3-cephem-4-carboxylic acid, 4.25 g. (9.35 mmole), and 4 ml. of bromomethylacetate, 6.12 g. (40 mmole), were dissolved in a mixture of 50 ml. of acetone and 25 ml. of DMF. The reaction mixture was stirred at room temperature while 1.26 ml. of triethylamine, 0.92 g. (9.2 mmole), in 30 ml. of acetone was added dropwise over a period of 2 hours. After the triethylamine addition was completed, the reaction mixture was stirred overnight. The reaction mixture was filtered and the filtrate was evaporated to dryness in vacuo. The residue was extracted with 1 l. of ethyl acetate in 200 ml. portions. The combined extract was filtered and the filtrate was washed successively with water, 3N hydrochloric acid, saturated sodium bicarbonate solution, and saturated sodium chloride. The ethyl acetate phase was dried ($Na_2SO_4$). The solvent was evaporated to dryness in vacuo. The residual oil crystallized upon standing. The solid was recrystallized from methanol to yield 0.4 g. of acetoxymethyl 7-[2-(1,2,3,4-tetrazol-1-yl)acetamido]-3-(2-methyl-1,3,4-thiadiazole-5-thiomethyl)-3-cephem-4-carboxylate, m.p. 115°–117.5°C. The product was single spot by TLC, and NMR indicated only $\Delta^3$ ester.

Analysis: $C_{17}H_{16}N_8S_3O_6$ MW 524.56 Calc: C, 38.93; H, 3.07; N, 21.36; S, 18.34; Found: C, 38.74; H, 3.29; N, 21.10; S, 18.09.

Example 3

Acetoxymethyl 7-D-mandelamido-3-(1-methyl-1,2,3,4-tetrazole-5-thiomethyl)-3-cephem-4-carboxylate Two grams (4.3 mmole) of 7-mandelamido-3-(1-methyltetrazol-5-yl)thiomethyl-3-cephem-4-carboxylate and 1.72 ml. (17.2 mmole) of bromomethyl acetate were dissolved in a mixture of 50 ml. of acetone and 10 ml. of DMF. The mixture was stirred at room temperature while 0.595 ml. (4.2 mmole) of triethylamine in 30 ml. of acetone was added dropwise over a period of one-half hour. After the addition was completed, the mixture was filtered and the filtrate was evaporated in vacuo. The residue was taken up in chloroform and successively washed with water, saturated sodium bicarbonate solution and finally saturated sodium chloride solution. The chloroform phase was dried ($Na_2SO_4$) and evaporated in vacuo to a foam residue. The crude residue was 2 spot by TLC (silica gel, ethyl acetate). The crude product was recrystallized from methanol to yield 0.151 g. of acetoxymethyl 7-D-mandelamido-3-(1-methyl-1,2,3,4-tetrazole-5-thiomethyl)-3-cephem-4-carboxylate, m.p. 126–130°C. with decomposition. An NMR spectrum of the crystallized product indicated only $\Delta^3$ ester.

Analysis: $C_{21}H_{22}N_6O_7S_2$ MW 534 Calc: C, 47.18; H, 4.15; N, 15.72; S, 12.00; Found: C, 47.03; H, 4.11; N, 15.45; S, 12.05.

I claim:

1. In a process for preparing a cephalosporin ester of the formula

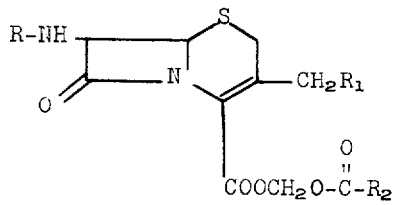

which comprises reacting a $\Delta^3$ cephalosporin acid of the formula

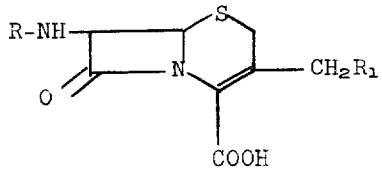

with a halomethyl ester of a lower alkanoic acid of the formula

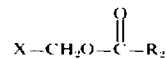

in the presence of base in an inert solvent at a temperature below 50°C. and recovering the product, the improvement which comprises adding one equivalent of base to an equimolar mixture of the acid and the halomethyl ester at a rate such that the rate of generation of acid anion is approximately equivalent to the rate of esterification;

wherein R
is acetyl, mandeloyl, 0-formylmandeloyl, 2-phenoxyacetyl, 2-phenylacetyl, N-t-BOC-phenylglycyl, 2-(2-thienyl)acetyl or 2-(1,2,3,4-tetrazol-1-yl)acetyl;

$R_1$ is hydrogen, acetoxy, methylthio, (2-methyl-1,3,4-thiadiazol-5-yl)thio or (1-methyl-1,2,3,4-tetrazol-5-yl)thio;

$R_2$ is methyl, ethyl, isopropyl or tert-butyl; and

X is chloro, bromo or iodo;

subject to the limitations that when R is N-t-BOC-phenylglycyl, $R_1$ is other than acetoxy, (2-methyl-1,3,4-thiadiazol-5-yl)thio or (1-methyl-1,2,3,4-tetrazol-5-yl)thio.

2. The process of claim 1 wherein the base is triethylamine.

3. The process of claim 2 wherein pivaloxymethyl 7-D-mandelamido-3-(1-methyl-1,2,3,4-tetrazole-5-thiomethyl)-3-cephem-4-carboxylate is prepared from 7-D-mandelamido-3-(1-methyl-1,2,3,4-tetrazole-5-thiomethyl)-3-cephem-4-carboxylic acid and chloromethyl pivalate.

4. The process of claim 2 wherein acetoxymethyl 7-D-mandelamido-3-(1-methyl-1,2,3,4-tetrazole-5-thiomethyl)-3-cephem-4-carboxylate is prepared from 7-D-mandelamido-3-(1-methyl-1,2,3,4-tetrazole-5-thiomethyl)-3-cephem-4-carboxylic acid and bromomethyl acetate.

5. The process of claim 2 wherein acetoxymethyl 7-[2-(1,2,3,4-tetrazol-1-yl)acetamido]-3-(2-methyl-1,3,4-thiadiazole-5-thiomethyl)-3-cephem-4-carboxylate is prepared from 7-[2-(1,2,3,4-tetrazol-1-yl)acetamido]-3-(2-methyl-1,3,4-thiadiazole-5-thiomethyl)-3-cephem-4-carboxylic acid and bromomethyl acetate.

* * * * *